(12) United States Patent
Sprague

(10) Patent No.: US 7,571,554 B2
(45) Date of Patent: Aug. 11, 2009

(54) HEAT RECOVERY AND VENTILATION SYSTEM FOR DRYERS

(76) Inventor: Michael M. Sprague, P.O. Box 231012, Portland, OR (US) 97281

( * ) Notice: Subject to any disclaimer, the term of this patent is extended or adjusted under 35 U.S.C. 154(b) by 382 days.

(21) Appl. No.: 11/296,039

(22) Filed: Dec. 6, 2005

(65) Prior Publication Data

US 2006/0168842 A1 Aug. 3, 2006

Related U.S. Application Data

(60) Provisional application No. 60/648,842, filed on Jan. 31, 2005.

(51) Int. Cl.
*F26B 3/00* (2006.01)
(52) U.S. Cl. .............................. 34/497; 34/558; 34/210
(58) Field of Classification Search ................. 165/143, 165/144; 34/493, 497, 558, 396, 72, 201, 34/218, 443, 518, 451, 510, 209, 210; 454/239, 454/256
See application file for complete search history.

(56) References Cited

U.S. PATENT DOCUMENTS

| | | | |
|---|---|---|---|
| 1,605,633 A | 11/1926 | Wright | |
| 1,663,181 A | 3/1928 | Sargent et al. | |
| 3,070,897 A | 1/1963 | Lowe | |
| 3,659,352 A | 5/1972 | Cook | |
| 3,739,484 A | 6/1973 | Wilkening et al. | |
| RE28,226 E | 11/1974 | Cook | |
| 4,168,579 A | 9/1979 | Ericsson | |
| 4,426,791 A | 1/1984 | Coppa | |
| RE31,633 E | 7/1984 | Lewis | |
| 4,499,911 A * | 2/1985 | Johnson | 131/302 |
| 4,621,437 A | 11/1986 | Grande et al. | |
| 4,636,168 A | 1/1987 | Sandstrom et al. | |
| 4,662,083 A * | 5/1987 | Carter et al. | 34/86 |
| 4,696,115 A | 9/1987 | Spadafora | |
| 4,953,298 A | 9/1990 | Carter et al. | |

(Continued)

OTHER PUBLICATIONS

Sales bulletin, "ThermoVent™ Power Venting and Heat Exchanger System," American Wood Dryers, Inc., 2 pages (publication date unknown).

(Continued)

*Primary Examiner*—Kenneth B Rinehart
(74) *Attorney, Agent, or Firm*—Klarquist Sparkman, LLP

(57) ABSTRACT

According to one embodiment, a ventilation system includes a heat-recovery device for pre-heating make-up air with exhaust air from multiple drying chambers (e.g., dry kilns for drying lumber). The ventilation system includes ductwork connecting the drying chambers to the heat-recovery device in a parallel arrangement. Supply ductwork for supplying pre-heated make-up air from the heat-recovery device to the drying chambers includes a main supply duct, or conduit, in fluid communication with the heat-recovery device and plural branch supply conduits, each of which establishes fluid communication with the main supply conduit and a respective drying chamber. Return ductwork for delivering exhaust air from the drying chambers to the heat-recovery device includes a main exhaust duct, or conduit, in fluid communication with the heat-recovery device and plural branch exhaust conduits, each of which establishes fluid communication with the main exhaust conduit and a respective drying chamber.

12 Claims, 6 Drawing Sheets

U.S. PATENT DOCUMENTS

| | | |
|---|---|---|
| 5,226,244 A | 7/1993 | Carter et al. |
| 5,269,076 A * | 12/1993 | Breckenridge ............... 34/413 |
| 5,276,980 A | 1/1994 | Carter et al. |
| 5,291,751 A | 3/1994 | Perez et al. |
| 5,425,182 A | 6/1995 | Brunner |
| 5,526,580 A | 6/1996 | Zippe et al. |
| 5,852,880 A | 12/1998 | Harrison |
| 5,983,521 A | 11/1999 | Thompson |

OTHER PUBLICATIONS

"Journey to Sustainability with Collins Products . . . " in *Klamath Life*, pp. 12A and 13A (Feb. 23, 1998).

Sales bulletin, "UltraVent Plus Dry Kiln Heat Recovery and Vent Optimization System," M. Sprague Incorporated, 2 pages (publicly used prior to Jan. 31, 2004).

* cited by examiner

HEAT RECOVERY AND VENTILATION SYSTEM FOR DRYERS

CROSS REFERENCE TO RELATED APPLICATION

The present application claims the benefit of U.S. Provisional Application No. 60/648,842, filed Jan. 31, 2005, which is incorporated herein by reference.

FIELD

The present disclosure concerns a heat recovery and ventilation system for dryers, such as might be employed in the drying of lumber.

BACKGROUND

In a conventional dry kiln used for drying lumber, a system of fans inside the kiln maintains a more or less uniform flow of air through the lumber. The moving air supplies heat to the wood and removes the wood's moisture, which is vented to the atmosphere outside of the kiln. The wet bulb and dry bulb temperatures of the air passing through the lumber are controlled, and various drying schedules can be used depending upon the moisture content of the wood, the wood species, and the end use of the lumber. Typically, air is circulated through the kiln in one direction, and after a period of time the air is circulated through the kiln in the opposite direction, thus maintaining uniformity of drying of the lumber. To maintain a desired humidity in the kiln, moisture laden air is exhausted through roof vents and as humid air is exhausted, drier colder outside air is drawn into the kiln and is heated within the kiln to operating temperature.

A conventional dry kiln wastes energy in several ways. For instance, humid exhaust air often is exhausted after it passes through heating coils within the dryer. This adds heat energy to the exhaust air, and this energy is wasted. Also, the incoming make-up air must be heated to accomplish the desired drying and pickup of moisture, which requires considerable heat energy for bringing the make-up air to its working temperature. These conditions lead to a more expensive operation in view of the energy actually required for drying.

Devices for pre-heating the make-up air with exhaust air are known. For example, U.S. Pat. No. 4,662,083 discloses a ventilation system that includes a flow control housing mounted to the roof of a dry kiln. The flow control housing includes a heat exchanger that removes heat from exhaust air vented from the kiln and transfers the heat to external make-up air before the make-up air is introduced into the kiln. A drawback of the system disclosed in the '083 patent is that a separate ventilation system is required for each dry kiln in a drying facility. If the facility has a large number of dry kilns, retrofitting each dry kiln can be cost prohibitive.

Accordingly, there is a continuing need for new and improved ventilation systems for dry kilns.

SUMMARY

The present disclosure concerns embodiments of a ventilation system for dryers, such as might be employed in the drying of lumber. According to one aspect, a ventilation system includes a heat-recovery device for pre-heating make-up air with exhaust air from multiple drying chambers (e.g., dry kilns for drying lumber). The ventilation system includes ductwork connecting the multiple drying chambers to the heat-recovery device in a parallel arrangement. Supply ductwork for supplying pre-heated make-up air from the heat-recovery device to the multiple drying chambers includes a main supply duct, or conduit, in fluid communication with the heat-recovery device and plural branch, or parallel, supply conduits, each of which establishes fluid communication with the main supply conduit and a respective drying chamber. Return ductwork for delivering exhaust air from the drying chambers to the heat-recovery device includes a main exhaust duct, or conduit, in fluid communication with the heat-recovery device and plural branch, or parallel, exhaust conduits, each of which establishes fluid communication with the main exhaust conduit and a respective drying chamber.

In particular embodiments, the heat-recovery device includes an intake air mover (e.g., a fan or blower) and an exhaust air mover (e.g., a fan or blower). The intake air mover induces relatively dry external make-up air to flow into a heat exchanger of the heat-recovery device, where it is heated by heat from the moist exhaust air from the drying chambers, and then through the main supply conduit for delivery through the branch supply conduits to the drying chambers. The exhaust air mover induces the hot, moist exhaust air from the drying chambers to flow into the heat exchanger, where heat from the exhaust air is transferred to the make-up air before the exhaust air is vented to atmosphere.

The ventilation system desirably includes a pressure controller that is operable to maintain substantially constant predetermined pressures in the main supply conduit and the main exhaust conduit. In certain embodiments, for example, the pressure controller receives inputs from first and second pressure transducers in the main supply conduit and the main exhaust conduit, respectively. Based on the inputs from the pressure transducers, the controller can vary the speed of the intake air mover and/or the exhaust air mover to increase or decrease the flow of air in the conduits as needed to maintain the predetermined pressures.

For example, if the pressure in the main supply conduit increases due to, for example, cooler, more dense air being drawn into the main supply conduit by the intake air mover, the controller sends a signal to decrease the speed of the intake air mover, thereby reducing the flow rate of intake air and maintaining the predetermined pressure in the main supply conduit. On the other hand, if the intake air mover draws in hotter, less dense air, there will be a temporary decrease in the pressure in the main supply conduit and the controller will send a signal to increase the speed of the intake air mover, thereby increasing the flow rate of intake air and maintaining the predetermined pressure in the main supply conduit. The controller likewise controls the speed of the exhaust air mover based on signals from the second pressure transducer 46 to increase or decrease the flow rate of air in the main exhaust conduit.

Because the multiple drying chambers are connected in parallel to the main supply and exhaust conduits and their respective branch supply and exhaust conduits, the pressures in the multiple drying chambers will be equalized at a desired level.

The foregoing and other features and advantages of the invention will become more apparent from the following detailed description of several embodiments, which proceeds with reference to the accompanying figures.

DETAILED DESCRIPTION

As used herein, the singular forms "a," "an," and "the" refer to one or more than one, unless the context clearly dictates otherwise.

As used herein, the term "includes" means "comprises."

Figure 1:
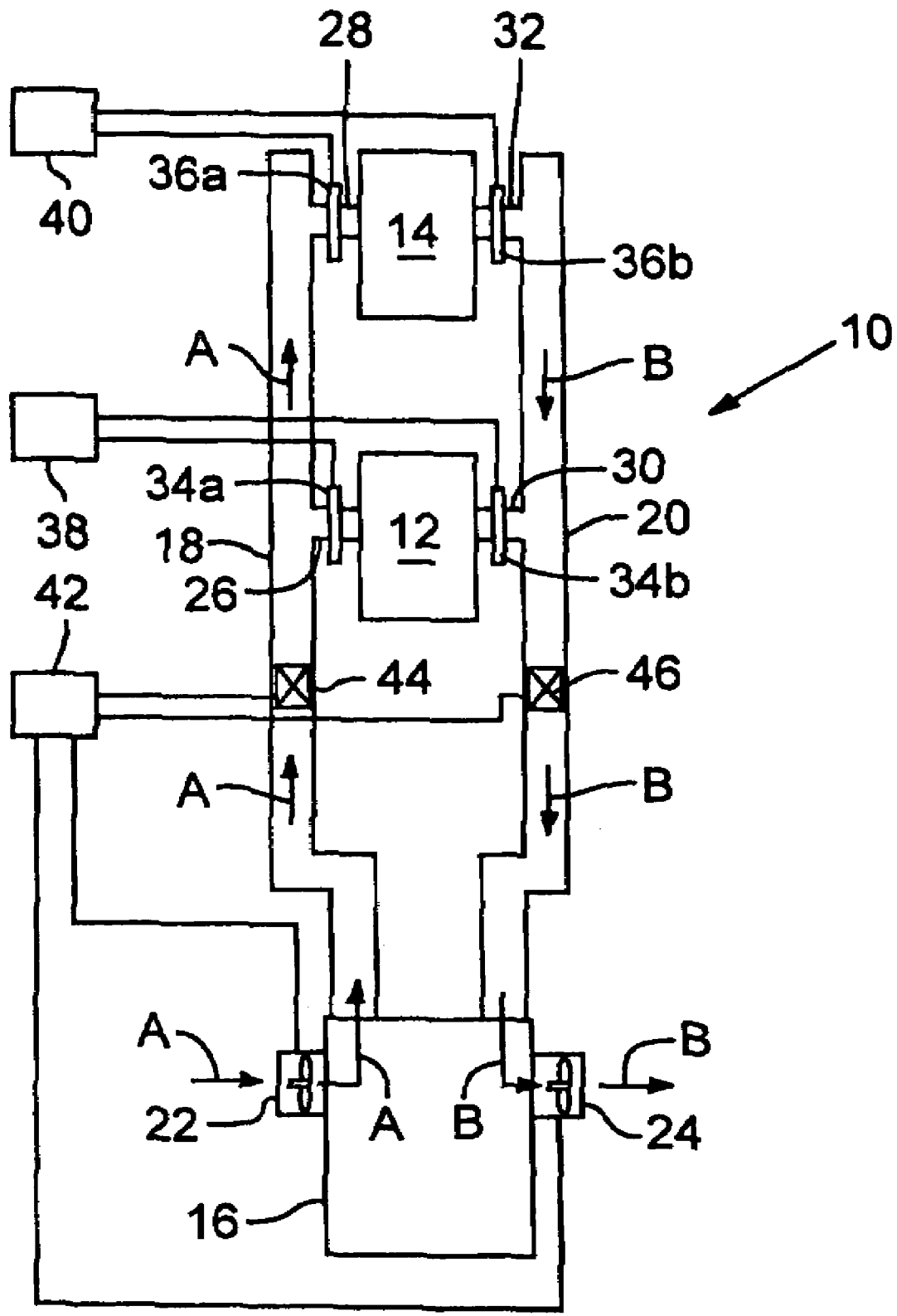
FIG. 1 is a schematic plan view of a ventilation system for multiple drying chambers, according to one embodiment.

FIG. 1 is a schematic view of a ventilation system 10, according to one embodiment, for controlling the flow of exhaust air and make-up air to at least first and second drying chambers 12 and 14, respectively. The drying chambers 12, 14 can be conventional lumber kilns for drying lumber or they can be dryers adapted to dry other types of articles, such as fruit. The system 10 includes an air-to-air heat exchanger 16, a main supply conduit 18 for supplying pre-heated make-up air from the heat exchanger 16 to the drying chambers 12, 14, and a main exhaust conduit 20 for supplying exhaust air from the drying chambers 12, 14 to the heat exchanger 16.

The heat exchanger 16 can be, for example, a heat pipe heat exchanger, although other suitable types of heat exchangers also can be used. The heat exchanger 16 can include an intake air fan 22 arranged to induce outside air to flow through the heat exchanger 16 and into the main the supply conduit 18 (in the direction indicated by arrows A), and an exhaust fan 24 arranged to induce exhaust air in the main exhaust conduit 20 to flow through the heat exchanger 16 to the atmosphere (in the direction indicated by arrows B). In alternative embodiments, blowers or other mechanisms for causing air to flow in the desired directions can be used in lieu of the illustrated fans 22, 24. The fans 22, 24 desirably are driven by respective variable-speed drivers (e.g., inverter drives) for varying the speed of the fans.

The main supply conduit 18 has first and second branch supply conduits 26 and 28, respectively, which establish fluid communication between the main supply conduit 18 and the first and second drying chambers 12, 14, respectively. The main exhaust conduit 20 has first and second branch exhaust conduits 30 and 32, respectively, which establish fluid communication between the main exhaust conduit 20 and the first and second drying chambers 12, 14, respectively.

The first branch supply conduit 26 and the first branch exhaust conduit 30 have respective dampers 34a, 34b for controlling the flow of make-up air into the first drying chamber 12 and for controlling the flow of exhaust air vented from the first drying chamber 12. Similarly, the second branch supply conduit 28 and the second branch exhaust conduit 32 have respective dampers 36a, 36b for controlling the flow of make-up air into the second drying chamber 14 and for controlling the flow of exhaust air vented from the second drying chamber 14. The dampers can be independently controlled to move between open and closed positions, or intermediate positions, to vary the flow of air into or out of the associated drying chamber 12, 14. Movement of the dampers can be accomplished using known techniques or mechanisms. For example, each damper can have a respective air-operated cylinder or an electric actuator to move the damper to a desired position (e.g., a closed or open position).

The system 10 in the illustrated embodiment also includes a first controller 38 and a second controller 40. The first controller 38 is operatively connected to the dampers 34a, 34b of the first branch supply conduit 26 and the first branch exhaust conduit 30. The second controller 40 is operatively connected to the dampers 36a, 36b of the second branch supply conduit 28 and the second branch exhaust conduit 32. The controllers 38, 40 also receive inputs from respective sensors (not shown) (e.g., conventional humidity sensors and/or temperature sensors) inside the drying chambers 12, 14, respectively.

The illustrated system 10 also includes a third controller 42 that receives inputs from first and second pressure transducers 44 and 46, respectively, which monitor the pressure in the main supply conduit 18 and the main exhaust conduit 20, respectively. The controller 42 is also operatively connected to the drivers of the intake fan 22 and the exhaust fan 24. The controller 42 controls the speed of the fans 22, 24 based on inputs from the pressure transducers 44, 46 to maintain substantially constant pressure in the main supply conduit 18 and the main exhaust conduit 20, as described in greater detail below.

In an alternative embodiment, a single controller can be used to perform the functions of the controllers 38, 40, 42. In this alternative embodiment, the controller is operatively connected to the dampers of the branch supply conduits 26, 28 and the branch exhaust conduits 30, 32, the pressure transducers 44, 46, and the drivers of the fans 22, 24.

In use, the intake fan 22 induces external ambient air (make-up air) to flow through the heat exchanger 16, where it is heated by exhaust air from the drying chambers 12, 14, and through the main supply conduit 18 for delivery to the drying chambers (in the direction of arrows A). The exhaust fan 24 induces exhaust air from the drying chambers 12, 14 to flow into the heat exchanger 16, where the exhaust air heats the supply air before being exhausted to atmosphere (in the direction of arrows B). The main supply conduit 20 supplies pressurized, pre-heated make-up air to the first and second branch supply conduits 26, 28, each of which supplies pressurized, heated air to a respective drying chamber 12, 14. The branch exhaust conduits 30, 32 deliver moisture laden exhaust air from the drying chambers 12, 14, respectively, to the main exhaust conduit 20.

The first and second controllers 38, 40 control the position of the dampers 34a, 34b, and the dampers 36a, 36b to maintain a desired wet bulb-dry bulb ventilation in the drying chambers 12, 14. In particular embodiments, for example, each controller 38, 40 receives inputs from one or more humidity sensors inside a respective drying chamber 12, 14. Based on the measured humidity in a chamber, the associated controller 38, 40 controls the position of one or both of the associated dampers to vary the flow of make-up (supply) air and/or exhaust air. For example, if the wet bulb in a drying chamber is greater than a desired set point, the respective controller sends a signal to the respective damper 34b, 36b on the exhaust side of the drying chamber to open and allow moisture laden exhaust air to vent from the drying chamber. The controller simultaneously sends a signal to the respective damper 34a, 34b on the supply side of the drying chamber to open and allow pre-heated make-up air to flow into the drying chamber.

The speed of the each fan 22, 24 is independently controlled in feedback fashion to substantially maintain predetermined pressures in the main supply conduit 18 and the main exhaust conduit 20. More specifically, the pressure transducers 44, 46 monitor the pressure in the main supply conduit 18 and the main exhaust conduit 20 and send respective signals to the third controller 42. The controller 42 compares the measured pressures to the respective predetermined pressures for the conduits 18, 20 and varies the speed of one or both fans 22, 24 to increase or decrease the flow of air.

For example, if the pressure in the main supply conduit 18 increases due to, for example, cooler, more dense air being drawn into the supply conduit 18 by the intake fan 22, the controller 42 sends a signal to the driver of the intake fan 22 to decrease the speed of the intake fan, thereby reducing the amount of intake air and maintaining the predetermined pressure in the supply conduit 18. On the other hand, if the intake fan 22 draws in hotter, less dense air, there will be a temporary decrease in the pressure in the supply conduit 18 and the controller will send a signal to the driver of the intake fan 22 to increase the speed of the intake fan to maintain the predetermined pressure in the supply conduit 18. The controller 42 likewise controls the speed of the exhaust fan 42 based on signals from the pressure transducer 46 to maintain substantially the predetermined pressure in the main exhaust conduit 20. The exact predetermined pressures for the main supply and exhaust conduits 18, 20 will vary depending on the requirements of the system.

Figure 2:
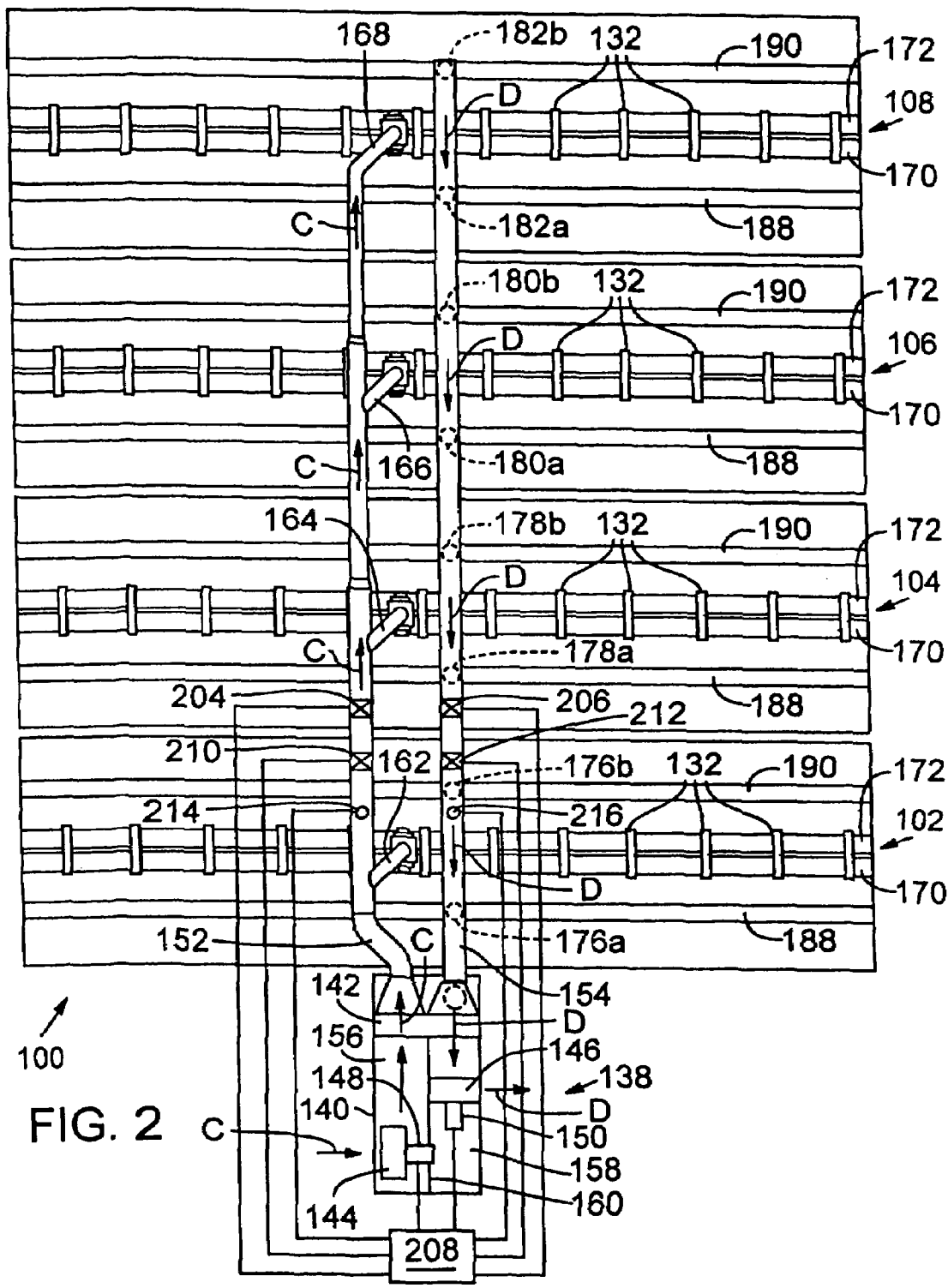
FIG. 2 is a plan view of a ventilation system for multiple dry kilns, according to another embodiment.
Figure 3:
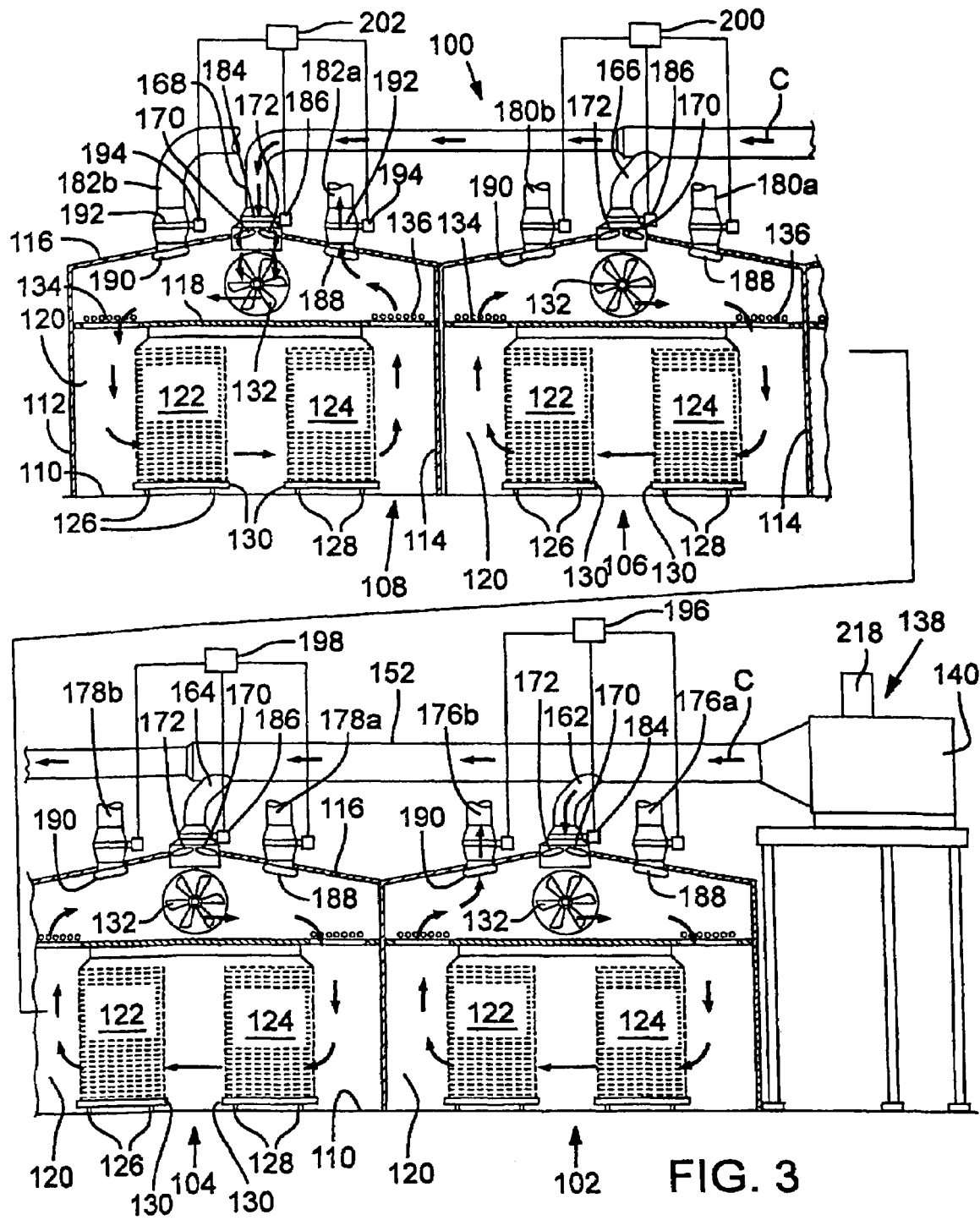
FIG. 3 is a side elevation view of the ventilation system of FIG. 2.

Referring to FIGS. 2 and 3, there is shown a ventilation system 100, according to another embodiment, for controlling the flow of exhaust air and make-up air to first, second, third, and fourth dry kilns 102, 104, 106, and 108, respectively, for drying lumber (or other articles). As best shown in FIG. 3, each dry kiln 102, 104, 106, 108 includes a floor 110, side walls such as those shown as 112 and 114, and a roof 116. Although the illustrated embodiment includes four dry kilns, there could be a greater or fewer number of kilns. As illustrated in FIG. 2, each kiln in the illustrated embodiment has a length that is much greater than the side-to-side dimension between respective side walls 112, 114.

As shown in FIG. 2, each dry kiln also has a platform 118 positioned downwardly from the roof 116 and extending between the side walls 112, 114. Below the platform 118 and above the floor 110 a drying chamber 120 is defined, which receives the product being dried, which is lumber in the illustrated example. Supported above the platform 118 in each kiln are a plurality of circulating fans 132 that are spaced lengthwise of the kiln (as shown in FIG. 2). Each kiln also has two sets of heating elements 134, 136 (FIG. 3), such as steam coils, supported above the platform 118 and extending lengthwise of the kiln on opposite sides of the fans 132. The fans 132 typically are reversible to cause air to circulate in either direction through a kiln. For example, the fans 132 of the kiln 102 in FIG. 3 are shown as producing air movement in the clockwise direction, while the fans 132 of the kiln 108 in FIG. 3 are shown as producing air movement in the counter-clockwise direction. In either case, as air is circulated through a kiln, the air is heated by the heating elements 134, 136.

Although not a requirement, the illustrated kilns are multiple load kilns, which are capable of drying two loads at a time, such as loads of stacked lumber 122, 124, which typically are spaced from one another in the direction of the circulated air, as illustrated in FIG. 3. Each kiln can have two sets of tracks 126, 128 extending lengthwise at the bottom of the drying chamber 120. A platform or dolly 130 is supported on each set of tracks 126, 128 and provides a support for a respective load 122, 124. In the usual instance, the lumber in loads 122, 124 extends lengthwise in the load, or in a direction paralleling the tracks. Tiers or layers of lumber in a stack may be separated from one another, such as with sticks or spacers to enable air flow between the layers and across the stack. In other embodiments, the system 100 can be used to control the atmosphere in other types of dry kilns.

The system 100 also includes a heat-recovery device 138 that assists in the drying operation of each kiln 102, 104, 106, 108. As shown in FIG. 2, the heat-recovery device 138 in the illustrated configuration includes a housing 140 that houses a heat exchanger 142, and an internal wall 160 that defines a first compartment 156 and a second compartment 158. An intake fan, or blower, 144, is disposed in the first compartment 156, and an exhaust fan, or blower, 146, is disposed in the second compartment 158. The intake and exhaust fans 144, 146 desirably are driven by variable speed drive motors 148, 150, respectively. A main supply conduit, or duct, 152 extending from the heat-recovery device 138 delivers make-up (supply) air to the kilns 102, 104, 106, 108. A main exhaust conduit, or duct, 154 extending from heat-recovery device 138 supplies exhaust air from the kilns 102, 104, 106, 108 to the heat-recovery device 138.

In use, the intake fan 144 induces external ambient air to flow into the first compartment 156, across the heat exchanger 142 and into the main supply conduit 152 (in the direction of arrows C). The exhaust fan 146 induces exhaust air in the main exhaust branch 154 to flow across the heat exchanger 142 before being vented to atmosphere (in the direction of arrows D). The exhaust air can be vented to the atmosphere through an exhaust stack 218 (FIG. 3). The heat exchanger 142 is operable to extract heat from the exhaust air and transfer it to the make-up air before it is distributed to the kilns via the main supply conduit 152. The heat exchanger 142 can be, for example, a heat pipe heat exchanger mounted across the first and second compartments 156, 158, as depicted in FIG. 2. In a typical installation, multiple heat pipes are mounted across the compartments 156, 158. The exact number of heat pipes will vary according to the calculated requirements of the system 100. In alternative embodiments, any of various other types of heat exchangers can be used to pre-heat the make-up air with heat recovered from the exhaust air.

A distribution system for delivering pre-heated make-up air to each kiln 102, 104, 106, 108 includes the main supply conduit 152 and a plurality of branch supply conduits 162, 164, 166, 168 that extend downwardly from the main supply conduit 152 and through an opening in the roof 116 of a respective kiln (as best shown in FIG. 3). As shown in FIG. 3, the branch supply conduits 162, 164, 166, 168 in the illustrated embodiment introduce air into the kilns at a location directly above the fans 132 and centered between the side walls 112, 114 of each kiln. Each branch supply conduit 162, 164, 166, 168 is fluidly connected to first and second internal supply conduits 170, 172 (FIGS. 2 and 3) extending longitudinally through a respective kiln. As depicted in FIG. 2, the supply conduits 170, 172 desirably extend the entire length, or substantially the entire length, of the kilns.

Figure 4:
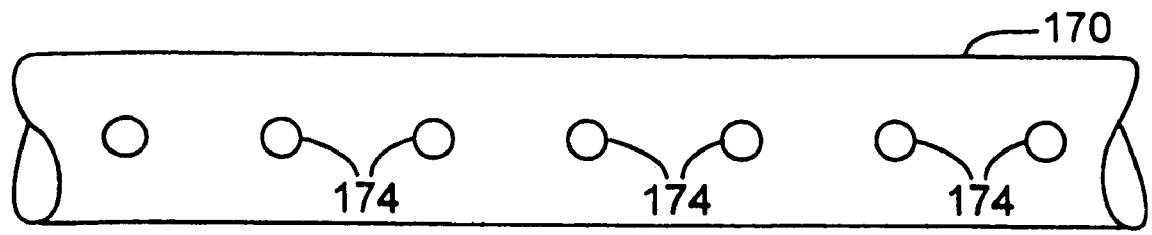
FIG. 4 is a bottom view of a supply conduit having a plurality of ports along its length for introducing make-up air into a kiln.

As shown in FIG. 4, each supply conduit 170 has a plurality of ports, or openings, 174 that are spaced along the majority of the length of the conduits 172 to allow supply air to be distributed into the kilns. The ports 174 can be evenly spaced along the length of each conduit 170 as shown. Alternatively, the ports 174 can be strategically located along the length of each conduit 170 to introduce make-up air at selected locations along the length of the respective kiln. Similarly, each supply conduit 172 has a plurality of ports, or openings, (not shown) that are longitudinally spaced along the majority of the length of the conduits 172 to allow supply air to be distributed into the kilns. As shown in FIG. 3, each branch supply conduit 162, 164, 166, 168 has a respective damper 184 to control the flow of make-up air into the conduits 170, 172. Each damper 184 has a respective damper actuator 186 (e.g., a pneumatic or electric actuator) to move the damper between a closed and open position.

An exhaust return system for delivering moisture laden exhaust air from the kilns 102, 104, 106, 108 to the heat-recovery device 138 includes the main exhaust conduit 154 (FIG. 2) and a first set of branch exhaust conduits 176a, 176b, a second set of branch exhaust conduits 178a, 178b, a third set of branch exhaust conduits 180a, 180b, and a fourth set of branch exhaust conduits 182a, 182b, each set communicating with the main exhaust conduit 154 and a respective kiln 102, 104, 106, 108. Each kiln includes first and second elongated exhaust conduits 188 and 190 extending lengthwise of the kiln on opposite sides of the supply conduits 170, 172.

As shown in FIG. 2, the first set of branch conduits 176a, 176b extend through openings in the roof 116 of the kiln 102 and are fluidly connected to the exhaust conduits 188, 190, respectively, in the kiln 102; the second set of branch conduits 178a, 178b extend through openings in the roof 116 of the kiln 104 and are fluidly connected to the exhaust conduits 188, 190, respectively, in the kiln 104; the third set of branch conduits 180a, 180b extend through openings in the roof 116 of the kiln 106 and are fluidly connected to the exhaust conduits 188, 190, respectively, in the kiln 106; and the fourth set of branch conduits 182a, 182b extend through openings in the roof 116 of the kiln 106 and are fluidly connected to the exhaust conduits 188, 190, respectively, in the kiln 106.

The exhaust conduits 188, 190 have a plurality of ports, or openings, (not shown) spaced along the majority of their length to allow exhaust air inside the kilns to flow into the conduits 188, 190. Each branch exhaust conduit 176a, 176b, 178a, 178b, 180a, 180b, 182a, 182b has a respective damper 192 (FIG. 3) to control the flow of exhaust air into the main exhaust conduit 154 (FIG. 2). Each damper 192 has a respective damper actuator 194 (FIG. 3) (e.g., a pneumatic or electric actuator) to move the damper between a closed and open position.

In the illustrated embodiment, the kilns 102, 104, 106, 108 have respective kiln controllers 196, 198, 200, 202 (FIG. 3), each of which is operatively connected to the damper actuators 186, 194 of a respective kiln. In particular embodiments, each kiln controller 196, 198, 200, 202 is operatively connected to one or more humidity sensors and/or temperature sensors in a respective kiln and to the fans 132 in a respective kiln. Each kiln controller controls the operation of the fans 132 in a respective kiln and can be programmed to circulate air (either in the clockwise or counterclockwise direction) according to a specified drying schedule. Each kiln controller also controls the closing and opening of the dampers in a respective kiln to maintain a desired wet bulb in the kiln.

One specific approach for controlling the flow of make-up air and exhaust air from each kiln is as follows. Typically, exhaust air is vented from a kiln through the branch exhaust conduit on the negative pressure side of the fans 132. For example, as shown in FIG. 3, the fans 132 in the kiln 108 are shown as circulating air in the counterclockwise direction. When it becomes necessary to remove exhaust air and replace it with pre-heated make-up air to maintain a desired wet bulb in the kiln 108, the controller 202 sends a signal to the damper actuator 194 of the branch exhaust conduit 182a to open the associated exhaust damper 192 and allow exhaust air to flow through the branch exhaust conduit 182a into the main exhaust conduit 154. The controller 202 also sends a signal to the damper actuator 186 to open the supply damper 184 of the branch supply conduit 168 and allow pre-heated make-up air to flow into the conduits 170, 172 and inside the kiln 108.

When the fans 132 are circulating air in the clockwise direction, exhaust air is vented through the other branch exhaust conduit. For example, the fans of the kiln 102 in FIG. 3 are shown as circulating air in the clockwise direction. During venting, the controller 196 sends a signal to the damper actuator 194 of the branch exhaust conduit 172b to open the associated exhaust damper 192 and allow exhaust air to flow through the branch exhaust conduit 172b into the main exhaust conduit 154. The controller 202 also sends a signal to the damper actuator 186 to open the supply damper 184 of the branch supply conduit 162 and allow pre-heated make-up air to flow into the conduits 170, 172 and inside the kiln 102.

As shown in FIG. 2, the illustrated system 100 also includes a pressure controller 208 that receives inputs from first and second pressure transducers 204 and 206, respectively, which monitor the pressures in the main supply conduit 152 and the main exhaust conduit 154, respectively. The controller 208 is also operatively connected to the motors 148, 150 of the intake fan 144 and the exhaust fan 146. The controller 208 controls the speed of the fans 144, 146 based on inputs from the pressure transducers 204, 206 to maintain substantially constant predetermined pressures in the main supply conduit 152 and the main exhaust conduit 154, in the manner previously described in regards to the system 10 of FIG. 1. Maintaining the predetermined pressures in the main supply conduit 152 and the main exhaust conduit 154 ensures that there is adequate flow of make-up air to all of the kilns and adequate flow of exhaust air to the heat-recovery device to pre-heat the make-up air to the desired temperature.

Alternatively, optional mass flow sensors 210, 212 and temperature sensors 214, 216 can be positioned in the main supply conduit 152 and the main exhaust conduit 154, respectively. The mass flow sensors 210, 212 and the temperature sensors 214, 216 send signals corresponding to mass flow and temperature in the main supply conduit 152 and the main exhaust conduit 154 to the controller 208. The controller 208 determines the pressure in the main supply conduit 152 and the main exhaust conduit 154 based on these inputs and controls the speed of the fans 144, 146 to maintain substantially constant predetermined pressures in the conduits 152, 154. The mass flow sensors 210, 212 and the temperature sensors 214, 216 can be used in lieu of or in addition to the pressure transducers 204, 206 to maintain the desired pressures in the conduits 152, 154.

As discussed above, the heat exchanger 142 extracts heat from the exhaust air and transfers it to the make-up air that is supplied to the kilns. In a typical installation, substantial waste energy can be recovered and re-used, thereby lowering the overall energy requirements of the system. Notably, any number of kilns can be connected to the heat recovery device 138. Thus, in plants having multiple kilns, the system is much less expensive to install than prior ventilation systems requiring one or more heat-recovery devices for each kiln. Another advantage of the system 100 is that it improves the operation of the individual kilns. In particular, the intake fan 144 and the exhaust fan 146 increase the velocity of circulating air through the loads during venting, thereby facilitating the drying process.

Figure 5:
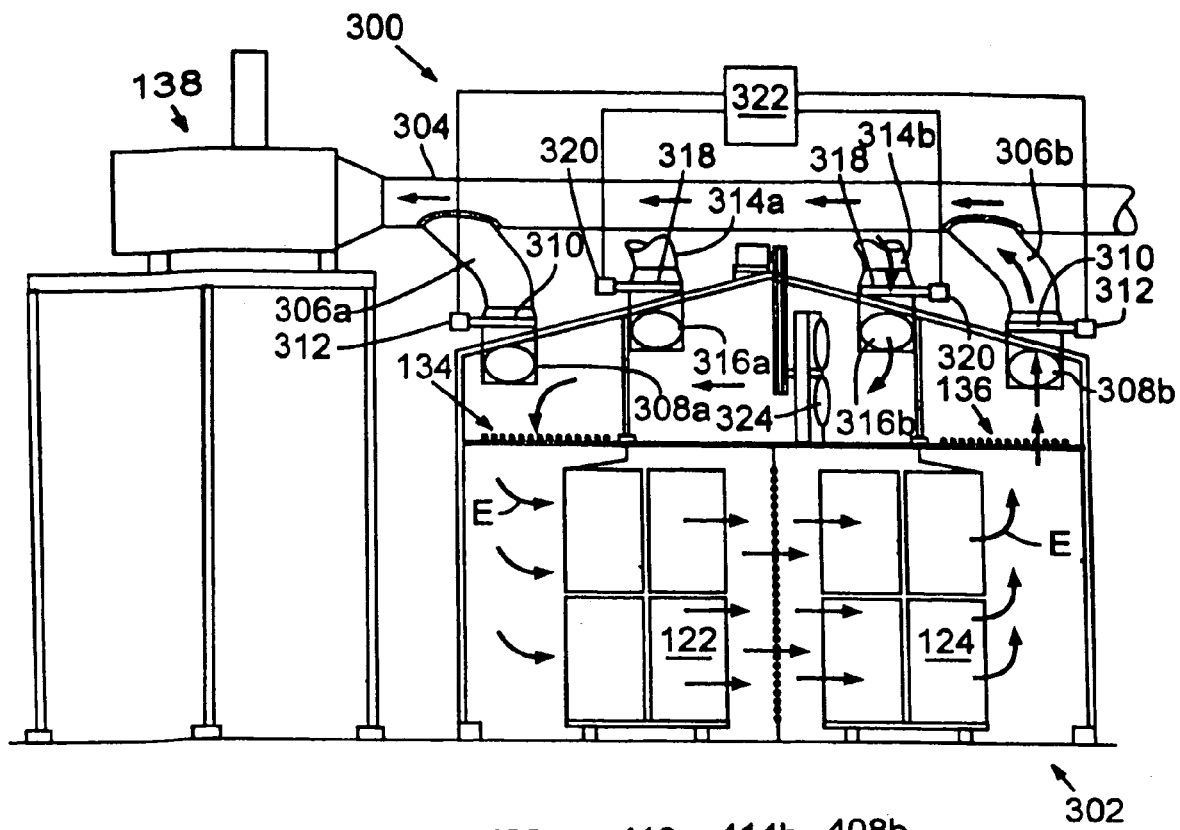
FIG. 5 is a side elevation view of a ventilation system for use with multiple dry kilns, according to another embodiment.

FIG. 5 shows a ventilation system 300 for controlling the flow of exhaust air and make-up air to multiple kilns 302 (only one of which is shown in FIG. 5). Each kiln 302 has a plurality of reversible fans 324 spaced lengthwise of the kiln for circulating air in the clockwise and counterclockwise directions. The system 300 of FIG. 5 is similar to the system 100 of FIGS. 2 and 3, except that the system 300 includes multiple branch supply conduits for supplying pre-heated make-up air to the kilns.

The system 300 includes a heat-recovery device 138, a main exhaust conduit 304 in communication with the heat-recovery device 138, and multiple sets of first and second branch exhaust conduits 306a, 306b, respectively, (only one set is shown in FIG. 5) in communication with the main exhaust conduit 304 and a respective kiln 302. The first and second branch exhaust conduits 306a, 306b of each kiln are in communication with respective elongated conduits 308a, 308b extending lengthwise on opposite sides of the longitudinal center of the kiln. The conduits 308a, 308b have ports or openings spaced along their length (in the same manner as conduit 170 in FIG. 4) to allow air inside the kiln to flow into the conduits during venting. Each branch exhaust conduit 306a, 306b has a respective exhaust damper 310 to control the flow of exhaust air into the main exhaust conduit 304. Each exhaust damper 310 has a respective damper actuator 312 to move the damper between closed and open positions.

A distribution system for distributing pre-heated make-up air from the heat-recovery device 138 includes a main supply conduit (not shown) and multiple sets of first and second branch supply conduits 314a, 314b, respectively, (only one set is shown in FIG. 5) in communication with the main supply conduit and a respective kiln 302. The first and second branch supply conduits 314a, 314b of each kiln are in communication with respective elongated conduits 316a, 316b extending lengthwise on opposite sides of the longitudinal center of the kiln. The conduits 316a, 316b have ports or openings spaced along their length (in the same manner as conduit 170 in FIG. 4) to allow air inside the conduits 316a, 316b to be distributed into the kiln. Each branch supply conduit 314a, 314b has a respective supply damper 318 to control the flow of make-up air into the kiln. Each supply damper 318 has a respective damper actuator 320 to move the damper between closed and open positions.

Each kiln 302 has a respective kiln controller 322 operatively connected to the damper actuators 312, 320, one or more humidity sensors (not shown) and/or temperature sensors (not shown) inside the kiln, and to the fans 324. Each kiln controller 322 controls the operation of the fans 324 in a respective kiln and can be programmed to circulate air (either in the clockwise or counterclockwise direction) according to a specified drying schedule. Each kiln controller also controls the closing and opening of the dampers in a respective kiln to maintain a desired wet bulb in the kiln.

One specific approach for controlling the flow of make-up air and exhaust air from each kiln 302 is as follows. Typically, exhaust air is vented from a kiln 302 and replaced with make-up air via the branch exhaust conduit and the branch supply conduit, respectively, on the negative pressure side of the fans 324. For example, in FIG. 5, air is shown as circulating in the counterclockwise direction through the kiln 302, as indicated by arrows E. When it becomes necessary to remove exhaust air and replace it with pre-heated make-up air to maintain a desired wet bulb in the kiln 302, the controller 322 sends a signal to the damper actuator 312 of the branch exhaust conduit 306b to open the associated exhaust damper 310 and allow exhaust air to flow through the branch exhaust conduit 306b into the main exhaust conduit 304. The controller 322 also sends a signal to the damper actuator 320 to open the supply damper 318 of the branch supply conduit 314b and allow pre-heated make-up air to flow into the kiln 302. If the fans 324 are not providing sufficient airflow during venting, the controller 322 sends a signal to open the supply damper 318 on the positive pressure side of the fans 324 and allow make-up air to flow into the kiln via the branch supply conduit 314a, thus increasing the pressure on the positive side of the fans.

When the fans 324 are circulating air in the clockwise direction through the kiln 302 and it becomes necessary to remove exhaust air and replace it with pre-heated make-up air to maintain the desired wet bulb in the kiln, the controller 322 sends a signal to the damper actuator 312 of the branch exhaust conduit 306a to open the associated exhaust damper 310 and allow exhaust air to flow through the branch exhaust conduit 306a into the main exhaust conduit 304. The controller 322 also sends a signal to the damper actuator 320 to open the supply damper 318 of the branch supply conduit 314a and allow pre-heated make-up air to flow into the kiln. If it becomes necessary to increase the pressure of the circulating air during venting, the controller 322 sends a signal to open the supply damper 318 on the positive pressure side of the fans 324 to allow air to flow into the kiln via the branch supply conduit 314b.

Figure 6:
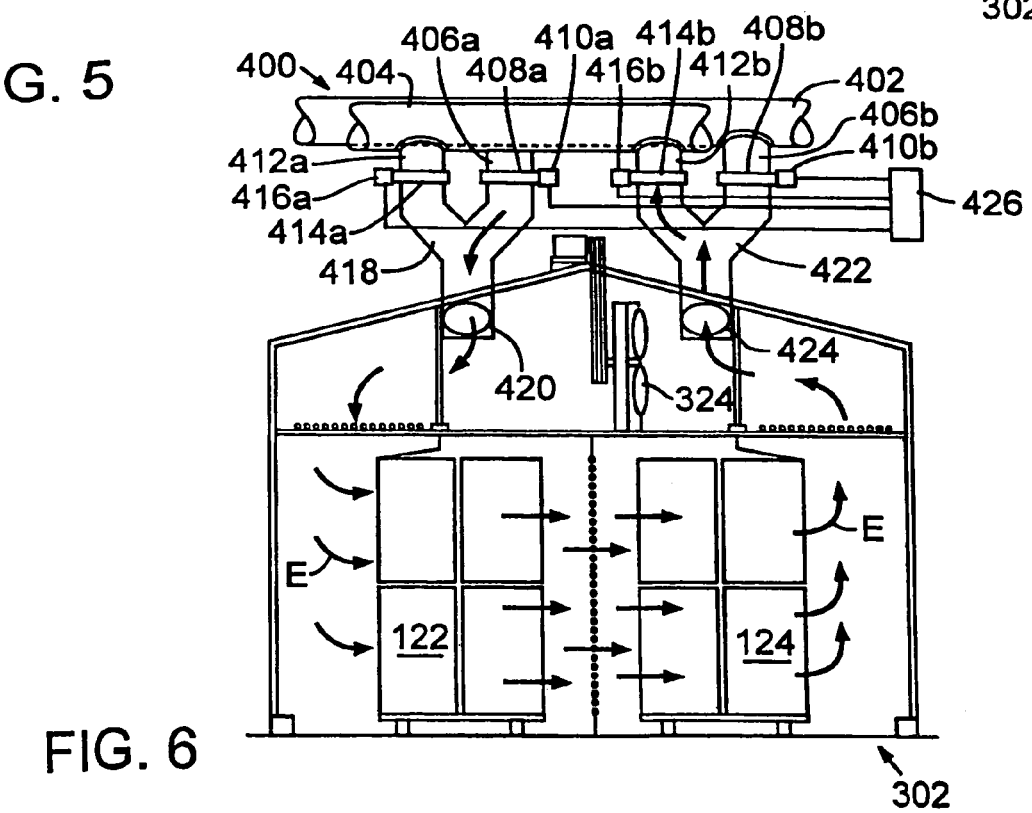
FIG. 6 is a side elevation view of a ventilation system for use with one or more dry kilns, according to still another embodiment.

FIG. 6 shows an alternative ventilation system, indicated generally at 400, for use in distributing pre-heated make-up air from the heat-recovery device 138 to one or more drying chambers, such as one or more kilns 302, and delivering exhaust air from the kilns to the heat-recovery device 138. The illustrated ventilation system 400 includes a main supply conduit 402 and a main exhaust conduit 404, which are in communication with the heat-recovery device 138 (not shown in FIG. 6). If the system includes only one kiln 302, the heat-recovery device 138 can be mounted on the roof of the kiln.

At each kiln 302, the main supply conduit 402 includes a first branch supply conduit 406a and a second branch supply conduit 406b, each of which has a respective damper 408a, 408b and damper actuator 410a, 410b. Similarly, at each kiln 302, the main exhaust conduit 404 includes a first branch exhaust conduit 412a and a second branch exhaust conduit 412b, each of which has a respective damper 414a, 414b and damper actuator 416a, 416b. A controller 426 is operatively connected to the damper actuators 410a, 410b, 416a, 416b.

As shown, the first branch supply conduit 406a and the first branch exhaust conduit 412a are connected to a common, generally Y-shaped conduit 418. The conduit 418 extends through an opening in the roof of the kiln 302 and is connected to an elongated conduit 420 extending lengthwise the majority of the length of the kiln. Similarly, the second branch supply conduit 406b and the second branch exhaust conduit 412b are connected to a common, generally Y-shaped conduit 422. The conduit 422 extends through an opening in the roof of the kiln 302 and is connected to an elongated conduit 424 extending lengthwise the majority of the length of the kiln opposite the conduit 420.

Figure 7:
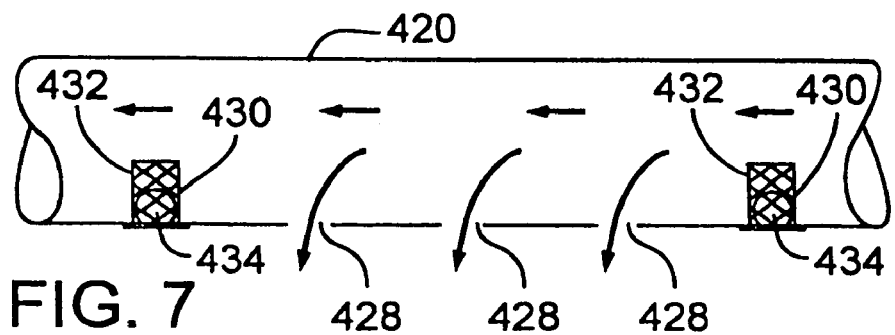
FIG. 7 is a side elevation view of a conduit similar to the conduit shown in FIG. 4, but having a plurality of check-valves at respective airflow ports in the conduit, with the conduit shown being used as a supply conduit whereby the check valves close the respective airflow ports to reduce the flow of air into a kiln.
Figure 8:
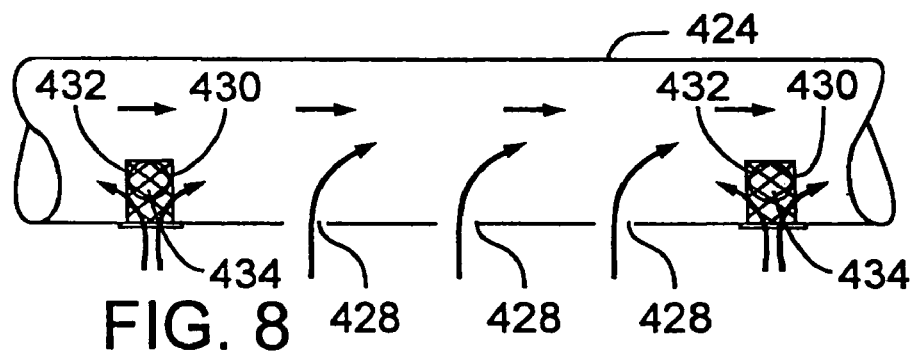
FIG. 8 is a side elevation view of conduit similar to that shown in FIG. 7, showing the conduit being used as an exhaust conduit whereby the check valves open and allow exhaust air in a kiln to flow through the respective airflow ports and into the conduit.

Each of the conduits 420, 424 can serve as either a supply conduit or an exhaust conduit, depending on the direction of the circulating air. As shown in FIGS. 7 and 8, each of the conduits 420, 424 have a plurality of ports, or openings, 428 spaced along their length to allow inlet and outlet of air. Typically, the flow of exhaust air exiting the kiln typically is greater than the required flow of make-up air into the kiln. As such, both conduits 420, 424 are sized large enough the handle the flow of exhaust air from the kiln. To reduce the overall flow of make-up air into the kiln, one or more ports 428 in the conduits 420, 424 are provided with one-way check valves 430 that prevent the outlet of air make-up air but allow for the inlet of exhaust air, as described in greater detail below. Each check valve 430 in the illustrated configuration includes an air-permeable, cylindrical cage 432 housing a spherical ball 434. The cage 432 can be formed from an expanded metal grating material as shown, a mesh screen, or any of various other air-permeable materials. The ball 434 is sized to seat against and form a seal with the periphery of a respective opening 428 to prevent outlet of air.

During venting, make-up air is introduced into the kiln 302 on the positive side of the fans 324, while exhaust air is vented on the negative side of the fans 324. For example, in FIG. 6, air is shown as circulating in the counterclockwise direction through the kiln 302, as indicated by arrows E. To remove exhaust air and replace it with make-up air, the controller 426 sends a signal to the damper actuator 410a to open the supply damper 408a and to the damper actuator 416b to open the exhaust damper 414b. This allows make-up air in the main supply conduit 402 to flow through the first branch supply conduit 406a, the conduit 420, and into the kiln 302. This also allows exhaust air in the kiln to flow into the conduit 424, through the second branch exhaust conduit 412b, and into the main exhaust conduit 404.

As depicted in FIG. 7, when the conduit 420 is supplying make-up air to the kiln 302, the check valves 430 in the conduit 420 close their respective ports 428 so that make-up air can flow into the kiln 302 only through the ports 428 without check valves 430, thus reducing the overall flow of make-up air into the kiln. As depicted in FIG. 8, the pressurized exhaust air flowing into the conduit 424 lift the balls 434 away from their respective ports 428 so that exhaust air can flow into the conduit 424 through all of the ports 428.

To remove exhaust air and replace it with make-up air when air is circulating in the opposite direction (i.e., the clockwise direction in FIG. 6), the controller 426 sends a signal to the damper actuator 410b to open the supply damper 408b and to the damper actuator 416a to open the exhaust damper 414a. This allows make-up air in the main supply conduit 402 to flow through the second branch supply conduit 406b, the conduit 424, and into the kiln 302. This also allows exhaust air in the kiln to flow into the conduit 420, through the first branch exhaust conduit 412a, and into the main exhaust conduit 404.

In the embodiments described above, the kilns include heating elements 134, 136 disposed inside of the kilns for heating circulating air. In other embodiments, a ventilation system can include one or more kilns that circulate air through a chamber or region outside of drying chamber for heating the circulating air, such as so-called "direct-fired" kilns. In a conventional direct-fired kiln, air is withdrawn from the drying chamber and then passes through equipment such as a burner chamber where the air is heated. The heated air together with products of combustion is then returned to the drying chamber.

Figure 9:
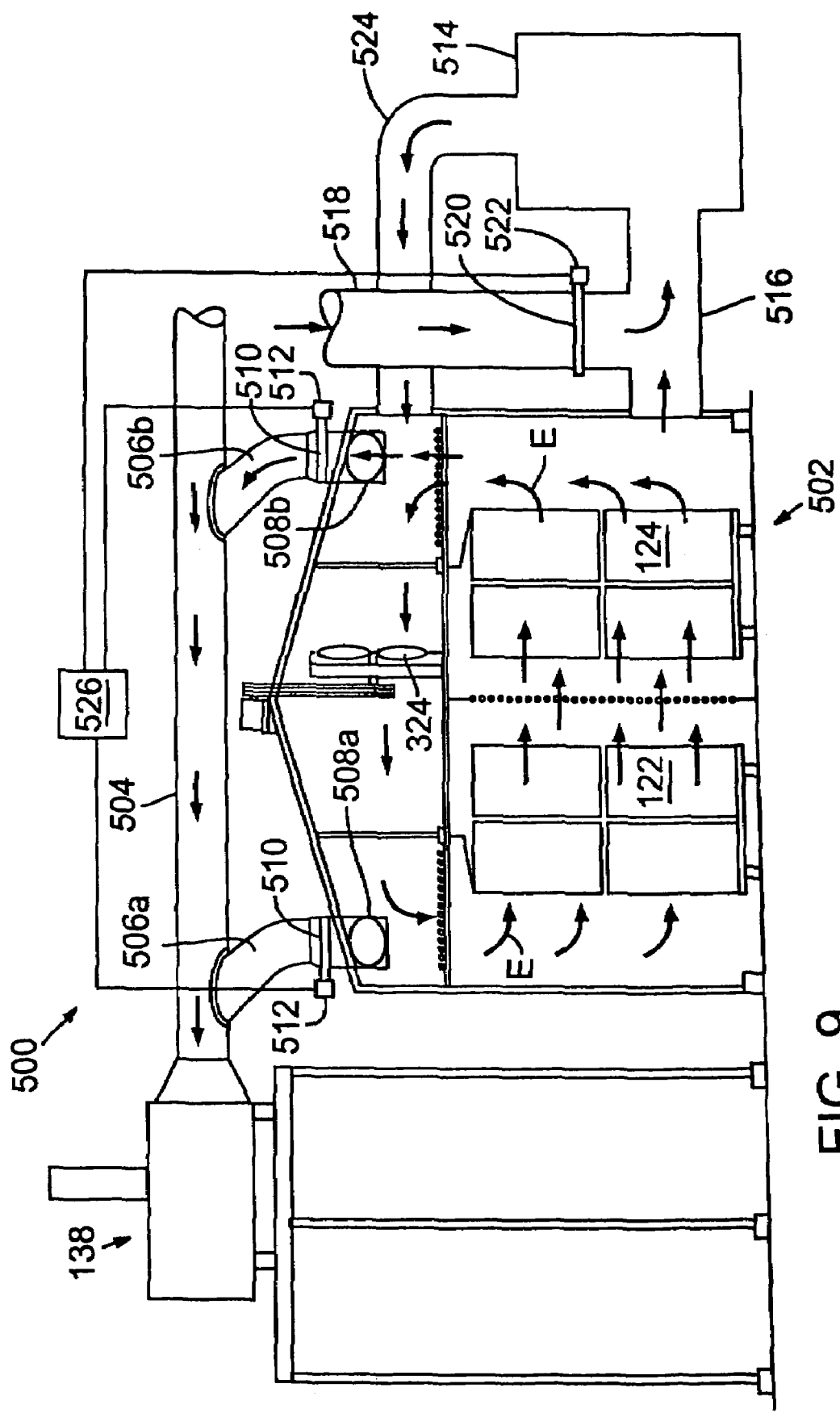
FIG. 9 is a side elevation view of an embodiment of a ventilation system for use with one or more direct-fired dry kilns.

FIG. 9, for example, shows a ventilation system 500 for distributing pre-heated make-up air from a heat-recovery device 138 to multiple direct-fired kilns 502 and delivering exhaust air from the kilns to the heat-recovery device 138.

The system 500 includes a main exhaust conduit 504 in communication with the heat-recovery device 138, and multiple sets of first and second branch exhaust conduits 506a, 506b, respectively, (only one set is shown in FIG. 9) in communication with the main exhaust conduit 504 and a respective kiln 502. The first and second branch exhaust conduits 506a, 506b of each kiln are in communication with respective elongated conduits 508a, 508b extending lengthwise on opposite sides of the longitudinal center of the kiln. The conduits 508a, 508b have ports or openings spaced along their length (in the same manner as conduit 170 in FIG. 4) to allow air inside the kiln to flow into the conduits during venting. Each branch exhaust conduit 506a, 506b has a respective exhaust damper 510 and damper actuator 512 to control the flow of exhaust air into the main exhaust conduit 504.

A burner chamber 514 is in communication with the inside of the kiln 502 via a conduit 516. Pre-heated, make-up air from the heat-recovery device 138 is introduced into the conduit 516 via a branch supply conduit 518. The branch supply conduit 518 is in communication with a main supply conduit (not shown) extending from the heat-recovery device 138. The branch supply conduit 518 has a supply damper 520 and actuator 522 to control the flow of make-up air into the burner chamber 514.

Fuel is burned by a conventional burner (not shown) within the burner chamber 514. A burner fan (not shown) induces air in the kiln 502 to flow into the burner chamber 514 through the conduit 516. Heated air together with combustion products are then returned to the kiln 502 via a return conduit 524.

Each kiln 502 has a respective kiln controller 526 operatively connected to the damper actuators 312, 522, one or more humidity sensors (not shown) and/or temperature sensors (not shown) inside the kiln, and to the fans 324. Typically, exhaust air is vented from a kiln 502 via the branch exhaust conduit on the negative pressure side of the fans 324. For example, in FIG. 9, air is shown as circulating in the counterclockwise direction through the kiln 502, as indicated by arrows E. During venting, the controller 526 sends a signal to open the exhaust damper 510 of the branch supply conduit 506b to allow exhaust air to flow into the main exhaust conduit 504 through the branch supply conduit 506b. The controller 526 also sends a signal to the damper actuator 522 to open the supply damper 520 and allow make-up air to flow into the burner chamber 514.

The present invention has been shown in the described embodiments for illustrative purposes only. The present invention may be subject to many modifications and changes without departing from the spirit or essential characteristics thereof. I therefore claim as my invention all such modifications as come within the spirit and scope of the following claims.

I claim:

1. A ventilation system for controlling the drying conditions in at least first and second drying chambers, the system comprising:
   a heat exchanger for pre-heating make-up air with exhaust air from the drying chambers;
   a main supply conduit in fluid communication with the heat exchanger and having at least first and second branch supply conduits for supplying pre-heated make-up air from the heat exchanger to the first and second drying chambers, respectively;
   a main exhaust conduit in fluid communication with the heat exchanger and having at least first and second branch exhaust conduits in fluid communication with the first and second drying chambers, respectively, such that exhaust air from the first and second drying chambers can flow into the main exhaust conduit via the first and second branch exhaust conduits, respectively;

a first air mover configured to induce make-up air from atmosphere to flow through the heat exchanger, the main supply conduit, the first and second branch supply conduits, and into the drying chambers;

a second air mover configured to induce exhaust air from the drying chambers to flow through the first and second branch exhaust conduits, the main exhaust conduit, the heat exchanger and then to the atmosphere; and a pressure controller operatively connected to the first and second air movers and configured to automatically vary the speed of the first and second air movers to maintain substantially constant predetermined pressures of the make-up air traveling from the heat exchanger through the main supply conduit into the first and second drying chambers, and the exhaust air traveling from the first and second drying chambers through the main exhaust conduit to the heat exchanger;

wherein the pressure controller comprises:

a first pressure transducer that is operable to measure the pressure in the main supply conduit; and a second pressure transducer that is operable to measure the pressure in the main exhaust conduit;

the pressure controller being operable to vary the speed of the first and second air movers based on the measured pressures to maintain substantially the predetermined pressures in the main supply conduit and the main exhaust conduit.

2. The ventilation system of claim 1, further comprising:

first and second exhaust dampers, the first exhaust damper situated to control the flow of exhaust air from the first drying chamber through the first branch exhaust conduit, the second exhaust damper situated to control the flow of exhaust air from the second drying chamber through the second branch exhaust conduit;

first and second supply dampers, the first supply damper situated to control the flow of pre-heated make-up air from the first branch supply conduit into the first drying chamber, the second supply damper situated to control the flow of pre-heated make-up air from the second branch supply conduit into the second drying chamber;

a first controller that is operable to control the first exhaust damper and the first supply damper to control the flow of pre-heated make-up air into the first drying chamber and the flow of exhaust air from the first drying chamber, thereby controlling the drying atmosphere in the first drying chamber; and a second controller that is operable to control the second exhaust damper and the second supply damper to control the flow of pre-heated make-up air into the second drying chamber and the flow of exhaust air from the second drying chamber, thereby controlling the drying atmosphere in the second drying chamber.

3. The ventilation system of claim 2, wherein:

the main supply conduit comprises third and fourth branch supply conduits, the third branch supply conduit being in fluid communication with the first drying chamber and having a third supply damper, the fourth branch supply conduit being in fluid communication with the second drying chamber and having a fourth supply damper;

the main exhaust conduit comprises third and fourth branch exhaust conduits, the third branch exhaust conduit being in fluid communication with the first drying chamber and having a third exhaust damper, the fourth branch exhaust conduit being in fluid communication with the second drying chamber and having a fourth exhaust damper;

the first controller is operable to control the first and third supply dampers so that air can be introduced into the first drying chamber via one or both of the first and third branch supply conduits, the first controller also being operable to control the first and third exhaust dampers so that air can be vented from the first drying chamber via one or both of the first and third branch exhaust conduits; and the second controller is operable to control the second and fourth supply dampers so that air can be introduced into the second drying chamber via one or both of the second and fourth branch supply conduits, the second controller also being operable to control the second and fourth exhaust dampers so that air can be vented from the second drying chamber via one or both of the second and fourth branch exhaust conduits.

4. The ventilation system of claim 1, further comprising:

a first internal conduit positioned in the first drying chamber and being in fluid communication with the first branch supply conduit, the first internal conduit having a plurality of airflow ports spaced along the length thereof to allow pre-heated make-up air from the first branch supply conduit to flow into the first drying chamber;

a second internal conduit positioned in the first drying chamber and being in fluid communication with the first branch exhaust conduit, the second internal conduit having a plurality of airflow ports extending along the length thereof to allow exhaust air from the first drying chamber to flow into the second internal conduit and the first branch exhaust conduit.

5. A ventilation system for controlling the drying conditions in at least first and second drying chambers, the system comprising:

a heat exchanger for pre-heating make-up air with exhaust air from the drying chambers;

a main supply conduit in fluid communication with the heat exchanger and having at least first and second branch supply conduits for supplying pre-heated make-up air from the heat exchanger to the first and second drying chambers, respectively;

a main exhaust conduit in fluid communication with the heat exchanger and having at least first and second branch exhaust conduits in fluid communication with the first and second drying chambers, respectively, such that exhaust air from the first and second drying chambers can flow into the main exhaust conduit via the first and second branch exhaust conduits, respectively;

a first air mover configured to induce make-up air from atmosphere to flow through the heat exchanger, the main supply conduit, the first and second branch supply conduits, and into the drying chambers;

a second air mover configured to induce exhaust air from the drying chambers to flow through the first and second branch exhaust conduits, the main exhaust conduit, the heat exchanger and then to the atmosphere; and a pressure controller operatively connected to the first and second air movers and configured to automatically vary the speed of the first and second air movers to maintain substantially constant predetermined pressures of the make-up air traveling from the heat exchanger through the main supply conduit into the first and second drying chambers, and the exhaust air traveling from the first and second drying chambers through the main exhaust conduit to the heat exchanger;

wherein the pressure controller comprises:
a first mass flow sensor operable to measure the mass flow rate of pre-heated make-up air in the main supply conduit;
a second mass flow sensor operable to measure the mass flow rate of exhaust air in the main exhaust conduit;
a first temperature sensor operable to measure the temperature of pre-heated make-up air in the main supply conduit; and
a second temperature sensor operable to measure the temperature of exhaust air in the main exhaust conduit;
the pressure controller being operable to vary the speed of the first air mover in response to the mass flow rate and the temperature of the main supply conduit to maintain a substantially constant predetermined pressure therein, the pressure controller also being operable to vary the speed of the second air mover in response to the mass flow rate and the temperature in the main exhaust conduit to maintain a substantially constant predetermined pressure therein.

6. A ventilation system for at least one drying chamber having one or more air movers for circulating air through the drying chamber, the system comprising:
a heat-recovery device comprising a heat exchanger for pre-heating external air with exhaust air from the drying chamber, an intake air mover for inducing external air to flow through the heat exchanger, and an exhaust air mover for inducing exhaust air from the drying chamber to flow through the heat exchanger;
first and second internal ducts extending through the drying chamber on opposite sides of the air movers of the drying chamber, each internal duct having a plurality of ports spaced along its length establishing fluid communication between the drying chamber and the ducts;
supply ductwork comprising a main supply duct in fluid communication with the heat-recovery device, the supply ductwork also comprising first and second branch supply ducts in fluid communication with the main supply duct and the first and second internal ducts, respectively; and
return ductwork comprising a main exhaust duct in fluid communication with the heat-recovery device, the return ductwork also comprising first and second branch exhaust ducts in fluid communication with the main exhaust duct and the first and second internal ducts, respectively;
wherein exhaust air can be vented through the first internal duct and the first branch exhaust duct while make-up air can be introduced into the drying chamber via the second branch supply duct and the second internal duct, and wherein exhaust air can be vented through the second internal duct and the second branch exhaust duct while make-up air can be introduced into the drying chamber via the first branch supply duct and the first internal duct;
wherein each branch supply duct has a respective supply damper and each branch exhaust duct has a respective exhaust damper;
wherein:
the first branch supply duct and the first branch exhaust duct are fluidly connected to a common duct that is fluidly connected to the first internal duct; and
the second branch supply duct and the second branch exhaust duct are fluidly connected to a common duct that is fluidly connected to the second internal duct.

7. A ventilation system for at least one drying chamber having one or more air movers for circulating air through the drying chamber, the system comprising:
a heat-recovery device comprising a heat exchanger for pre-heating external air with exhaust air from the drying chamber, an intake air mover for inducing external air to flow through the heat exchanger, and an exhaust air mover for inducing exhaust air from the drying chamber to flow through the heat exchanger;
first and second internal ducts extending through the drying chamber on opposite sides of the air movers of the drying chamber, each internal duct having a plurality of ports spaced along its length establishing fluid communication between the drying chamber and the ducts;
supply ductwork comprising a main supply duct in fluid communication with the heat-recovery device, the supply ductwork also comprising first and second branch supply ducts in fluid communication with the main supply duct and the first and second internal ducts, respectively; and
return ductwork comprising a main exhaust duct in fluid communication with the heat-recovery device, the return ductwork also comprising first and second branch exhaust ducts in fluid communication with the main exhaust duct and the first and second internal ducts, respectively;
wherein exhaust air can be vented through the first internal duct and the first branch exhaust duct while make-up air can be introduced into the drying chamber via the second branch supply duct and the second internal duct, and wherein exhaust air can be vented through the second internal duct and the second branch exhaust duct while make-up air can be introduced into the drying chamber via the first branch supply duct and the first internal duct;
wherein:
the first internal duct has one or more check valves for preventing air inside the duct from flowing outwardly through one or more corresponding ports; and
the second internal duct has one or more check valves for preventing air inside the duct from flowing outwardly through one or more corresponding ports.

8. The ventilation system of claim 7, wherein each check valve comprises an air-permeable housing adjacent one of said ports and a ball disposed in the housing for closing a respective port when make-up air is flowing through the internal ducts.

9. The ventilation system of claim 7, further comprising a pressure controller operatively connected to the intake air mover and the exhaust air mover and configured to automatically vary the speed of the intake and exhaust air movers to maintain substantially constant predetermined pressures in the main supply duct and the main exhaust duct.

10. A ventilation system for controlling the drying conditions in at least first and second drying chambers, the system comprising:
a heat exchanger for pre-heating make-up air with exhaust air from the drying chambers;
a main supply conduit in fluid communication with the heat exchanger and having at least first and second branch supply conduits for supplying pre-heated make-up air from the heat exchanger to the first and second drying chambers, respectively;
a main exhaust conduit in fluid communication with the heat exchanger and having at least first and second branch exhaust conduits in fluid communication with the first and second drying chambers, respectively, such that exhaust air from the first and second drying chambers can flow into the main exhaust conduit via the first and second branch exhaust conduits, respectively;

a first air mover configured to induce make-up air from atmosphere to flow through the heat exchanger, the main supply conduit, the first and second branch supply conduits, and into the drying chambers;

a second air mover configured to induce exhaust air from the drying chambers to flow through the first and second branch exhaust conduits, the main exhaust conduit, the heat exchanger and then to the atmosphere;

first and second exhaust dampers, the first exhaust damper situated to control the flow of exhaust air from the first drying chamber through the first branch exhaust conduit, the second exhaust damper situated to control the flow of exhaust air from the second drying chamber through the second branch exhaust conduit;

first and second supply dampers, the first supply damper situated to control the flow of pre-heated make-up air from the first branch supply conduit into the first drying chamber, the second supply damper situated to control the flow of pre-heated make-up air from the second branch supply conduit into the second drying chamber;

a first controller that is operable to control the first exhaust damper and the first supply damper to control the flow of pre-heated make-up air into the first drying chamber and the flow of exhaust air from the first drying chamber, thereby controlling the drying atmosphere in the first drying chamber; and a second controller that is operable to control the second exhaust damper and the second supply damper to control the flow of pre-heated make-up air into the second drying chamber and the flow of exhaust air from the second drying chamber, thereby controlling the drying atmosphere in the second drying chamber;

wherein the main supply conduit comprises third and fourth branch supply conduits, the third branch supply conduit being in fluid communication with the first drying chamber and having a third supply damper, the fourth branch supply conduit being in fluid communication with the second drying chamber and having a fourth supply damper;

wherein the main exhaust conduit comprises third and fourth branch exhaust conduits, the third branch exhaust conduit being in fluid communication with the first drying chamber and having a third exhaust damper, the fourth branch exhaust conduit being in fluid communication with the second drying chamber and having a fourth exhaust damper;

wherein the first controller is operable to control the first and third supply dampers so that air can be introduced into the first drying chamber via one or both of the first and third branch supply conduits, the first controller also being operable to control the first and third exhaust dampers so that air can be vented from the first drying chamber via one or both of the first and third branch exhaust conduits; and wherein the second controller is operable to control the second and fourth supply dampers so that air can be introduced into the second drying chamber via one or both of the second and fourth branch supply conduits, the second controller also being operable to control the second and fourth exhaust dampers so that air can be vented from the second drying chamber via one or both of the second and fourth branch exhaust conduits.

11. A ventilation system for controlling the drying conditions in at least first and second drying chambers, the system comprising:

a heat exchanger for pre-heating make-up air with exhaust air from the drying chambers;

a main supply conduit for receiving pre-heated make-up air from the heat exchanger and having one or more branch supply conduits establishing fluid communication between the main supply conduit and each of the first and second drying chambers, each branch supply conduit having a respective damper to vary the flow of make-up air into an associated drying chamber; and a main exhaust conduit for delivering exhaust air from the drying chambers to the heat exchanger and having one or more branch exhaust conduits establishing fluid communication between the main exhaust conduit and each of the first and second drying chambers, each branch exhaust conduit having a respective damper to vary the flow of exhaust air from an associated drying chamber to the main exhaust conduit;

wherein each drying chamber has one or more air movers for circulating air through the chamber, the air movers being reversible to circulate air in first and second opposing directions;

wherein each of the first and second drying chambers houses at least first and second longitudinal ducts extending the majority of the length of the chambers and on opposite sides of the air movers from each other, each longitudinal duct having a plurality of openings spaced along the length thereof;

wherein each of the first longitudinal ducts is in fluid communication with the main supply conduit via one of said branch supply conduits and the main exhaust conduit via one of said branch exhaust conduits;

wherein each of the second longitudinal ducts is in fluid communication with the main supply conduit via one of said branch supply conduits and the main exhaust conduit via one of said branch exhaust conduits;

wherein each branch supply conduit has a respective supply damper;

wherein each branch exhaust conduit has a respective exhaust damper;

wherein when air is circulating in the first direction in a drying chamber, pre-heated make-up air can be introduced into the drying chamber via a respective first longitudinal duct and exhaust air can be vented from the drying chamber via a respective second longitudinal duct, and wherein when air is circulating in the second direction in a drying chamber, pre-heated make-up air can be introduced into the drying chamber via a respective second longitudinal duct and exhaust air can be vented from the drying chamber via a respective first longitudinal duct; and wherein one or more of the openings of the first and second longitudinal ducts have respective check valves to prevent outlet of air but allow inlet of air.

12. The ventilation system of claim 11, wherein each check valve comprises a cage and a ball contained in the cage, the ball being sized to close a respective opening and prevent outlet of air.

* * * * *

UNITED STATES PATENT AND TRADEMARK OFFICE
CERTIFICATE OF CORRECTION

PATENT NO.        : 7,571,554 B2                                Page 1 of 1
APPLICATION NO. : 11/296039
DATED             : August 11, 2009
INVENTOR(S)       : Michael M. Sprague It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 630 days.

Signed and Sealed this

Seventh Day of September, 2010

David J. Kappos
*Director of the United States Patent and Trademark Office*